US011356298B2

(12) United States Patent
Umakoshi et al.

(10) Patent No.: US 11,356,298 B2
(45) Date of Patent: Jun. 7, 2022

(54) ACCESS MANAGEMENT APPARATUS AND ACCESS MANAGEMENT METHOD

(71) Applicant: NIPPON TELEGRAPH AND TELEPHONE CORPORATION, Tokyo (JP)

(72) Inventors: Kenji Umakoshi, Musashino (JP); Ryohei Banno, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/644,588

(22) PCT Filed: Sep. 11, 2018

(86) PCT No.: PCT/JP2018/033559
§ 371 (c)(1),
(2) Date: Mar. 5, 2020

(87) PCT Pub. No.: WO2019/059034
PCT Pub. Date: Mar. 28, 2019

(65) Prior Publication Data
US 2021/0067379 A1 Mar. 4, 2021

(30) Foreign Application Priority Data
Sep. 21, 2017 (JP) .............................. JP2017-181526

(51) Int. Cl.
*G06F 15/173* (2006.01)
*H04L 12/66* (2006.01)
*H04L 41/08* (2022.01)
(52) U.S. Cl.
CPC .............. *H04L 12/66* (2013.01); *H04L 41/08* (2013.01)

(58) Field of Classification Search
CPC ...... H04L 12/66; H04L 41/08; H04L 41/0893
(Continued)

(56) References Cited

U.S. PATENT DOCUMENTS 9,087,189 B1 * 7/2015 Koeten ............... H04L 41/0226
9,554,276 B2 * 1/2017 Thirasuttakorn ....... H04L 63/20
(Continued)

FOREIGN PATENT DOCUMENTS

JP 2009021759 A 1/2009
JP 2014522163 A 8/2014
(Continued)

OTHER PUBLICATIONS

"What is Kong", [online], Kong-Open-source API Management and Microservice Management, (searched May 1, 2017), Internet <URL:https://getkong.org/about/>.
(Continued)

*Primary Examiner* — Bharat Barot
(74) *Attorney, Agent, or Firm* — Harness, Dickey & Pierce, P.L.C.

(57) ABSTRACT

An access management apparatus is presented which is capable of realizing integrated access management based on an access management policy set independently of protocols of a plurality of processing systems. The access management apparatus is provided with a gateway including an access management function unit that is connected between an access source (AS) and a plurality of processing systems (PS), and that is configured to receive an access request from the access source (AS), and to control the access request based on the set access management policy.

13 Claims, 7 Drawing Sheets

(58) Field of Classification Search
USPC ................................................ 709/223–224
See application file for complete search history.

(56) References Cited

U.S. PATENT DOCUMENTS

| | | | |
|---|---|---|---|
| 10,530,598 B2* | 1/2020 | Ansari | H04L 41/0803 |
| 10,671,760 B2* | 6/2020 | Esmailzadeh | G06F 21/6263 |
| 2003/0172073 A1* | 9/2003 | Brodsky | G06F 16/258 |
| | | | 707/999.01 |
| 2009/0017815 A1 | 1/2009 | Takeda | |
| 2009/0064308 A1* | 3/2009 | Komatsu | H04L 63/0209 |
| | | | 726/12 |
| 2011/0047610 A1* | 2/2011 | Mylavarapu | H04L 63/20 |
| | | | 726/12 |
| 2013/0045706 A1 | 2/2013 | Hsu | |
| 2013/0250968 A1 | 9/2013 | Zhou et al. | |
| 2014/0123259 A1* | 5/2014 | Coletta | H04L 67/141 |
| | | | 726/7 |
| 2016/0366136 A1 | 12/2016 | Heldt-Sheller et al. | |

FOREIGN PATENT DOCUMENTS

| | | |
|---|---|---|
| JP | 2015210785 A | 11/2015 |
| JP | 2017016189 A | 1/2017 |

OTHER PUBLICATIONS

"mosquitto.conf-the configuration file for mosquitto", (searched May 1, 2017), Internet, <URL:http://mosquitto.org/man/mosquitto-conf-5.html>.
International Search Report (English and Japanese) issued in PCT/JP2018/033559, dated Nov. 20, 2018; ISA/JP dated Dec. 19, 2020.
International Preliminary Report on Patentability from counterpart PCT/JP2018/033559, including the English translation of the Written Opinion, dated Mar. 24, 2020.

* cited by examiner

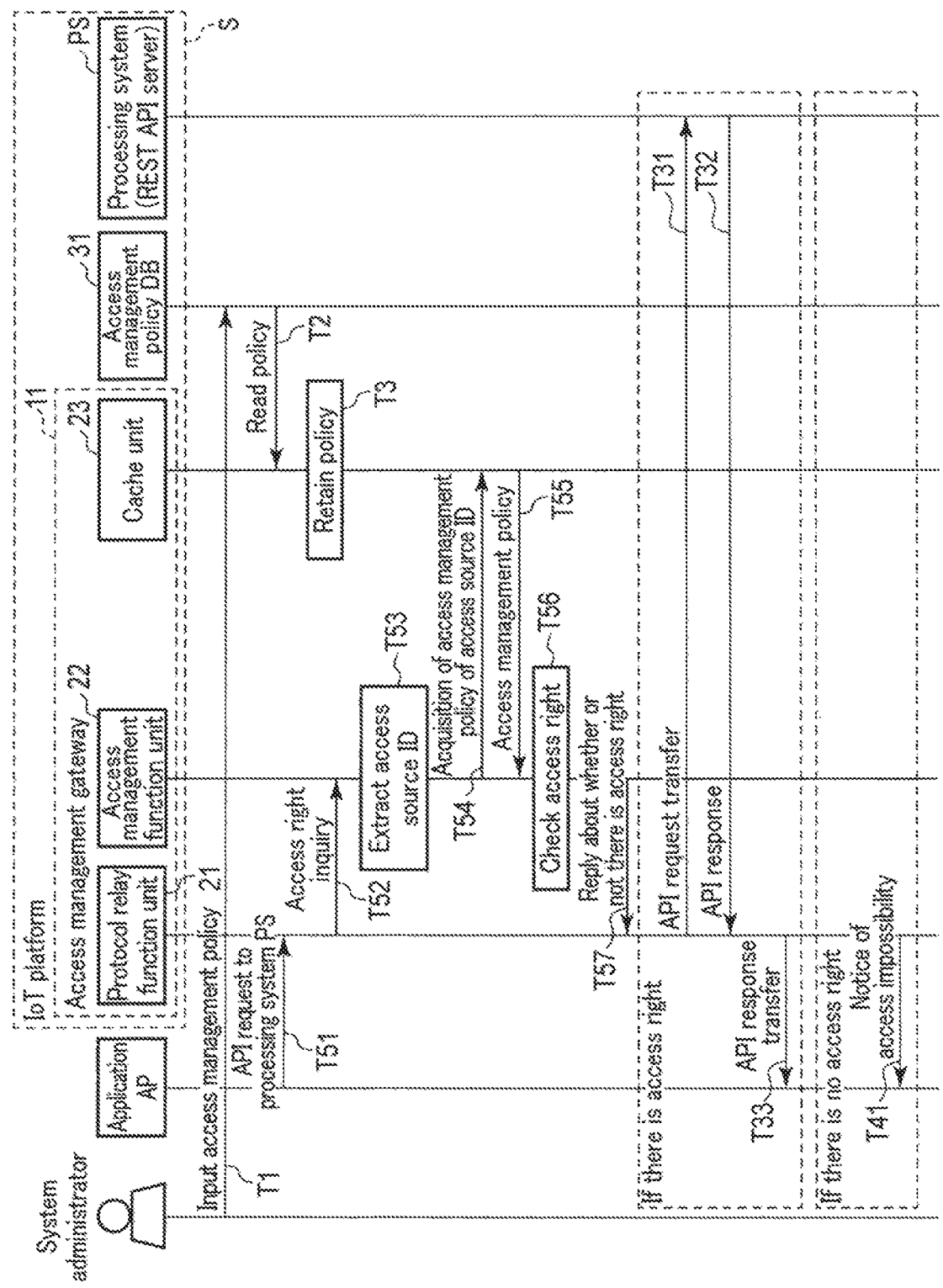
F I G. 4

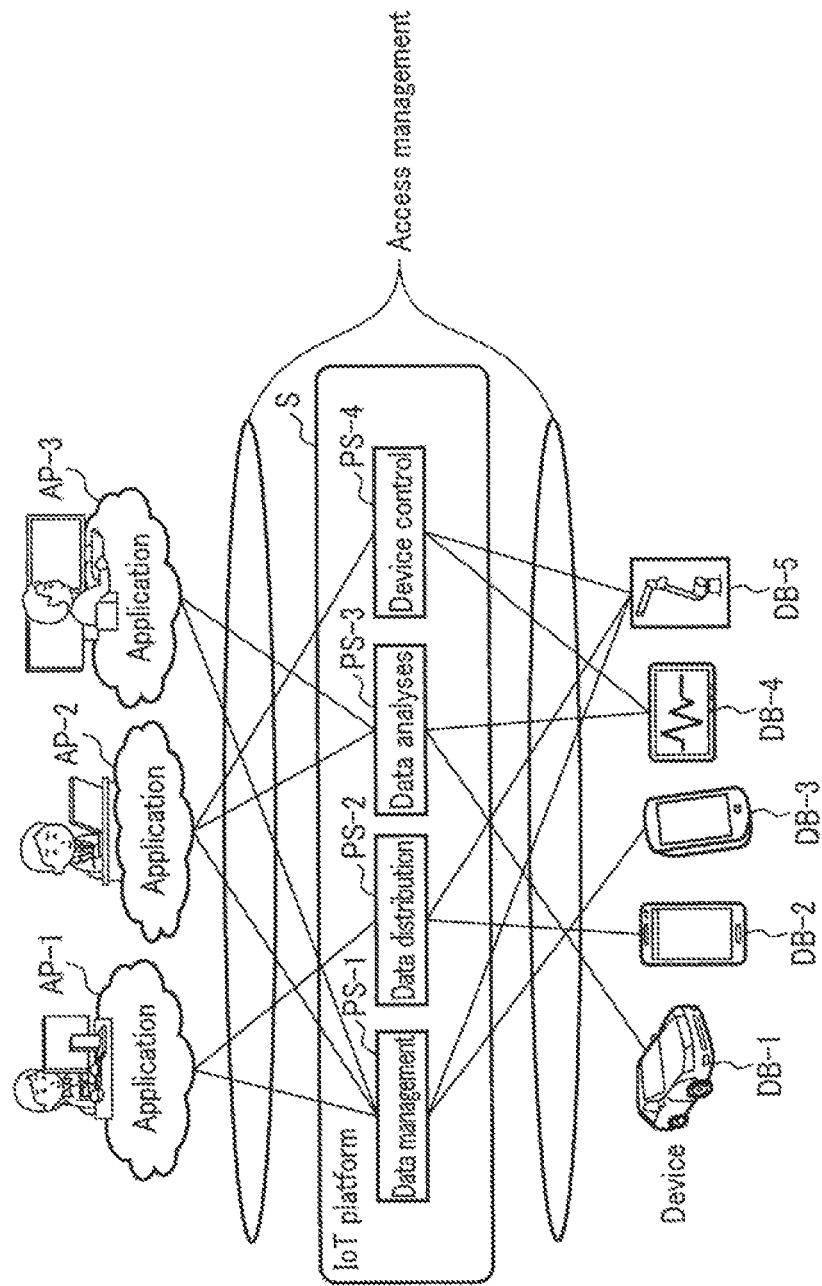
F I G. 5

|  | Operation cost | Resource consumption | Application development cost | Risk of inconsistency in policy |
|---|---|---|---|---|
| Individual support | Large | Large | Large | Large |
| Present invention | Small | Small | Small | No |

FIG. 8

000
ACCESS MANAGEMENT APPARATUS AND ACCESS MANAGEMENT METHOD

CROSS-REFERENCE TO RELATED APPLICATIONS

This is a U.S. national phase application under 35 USC 371 of international application PCT/JP2018/033559 (not published in English), filed Sep. 11, 2018, which claims priority to Japanese patent application No. 2017-181526, filed on Sep. 21, 2017. The entire disclosures of the above applications are incorporated herein by reference.

FIELD

The invention relates generally to an access management apparatus and an access management method.

BACKGROUND

Platforms (IoT platforms) that enable easy construction of IoT (Internet of Things) services have attracted attention. In order to realize various services, IoT platforms are assumed to provide different types of processing systems (data management systems, data distribution systems, etc.), and to support different types of protocols (Hypertext Transfer Protocol (HTTP), Message Queueing Telemetry Transport (MQTT), etc.) suitable for these processing systems.

Therefore, there is a need to manage data input to and output from these processing systems. In the specification, "management" includes access control, simultaneous access limit, priority control, and the like. In addition, sensitive data may be included in data input to and output from the processing system. Sensitive data includes, for example, data relating to production processes in the manufacturing industry, personal vital data, and the like.

Conventionally, in an IoT platform, each processing system includes an interface corresponding to an application program (hereinafter referred to as "application") and a device. For this reason, it is possible to realize access management by individually mounting an access management mechanism on each of these interfaces (=individual support). FIG. 7 is a diagram showing an outline of an access management apparatus of a conventional IoT platform S. As shown in FIG. 7, each of data processing systems PS-1 to PS-N of the IoT platform S corresponding to access sources AS-1 to AS-N has an access management mechanism.

FIG. 5 is a diagram showing the relationship between the data processing systems PS-1 to PS-4 and applications AP-1 to AP-3, which are access sources, and between the data processing systems PS-1 to PS-4 and devices DB-1 to DB-5, which are access sources.

In FIG. 5, the applications AP-1 to AP-3 and the devices DB-1 to DB-5, which are access sources, can access the data processing systems PS-1 to PS-4 of the IoT platform S. Each data processing system PS-1 to PS-4 includes an interface corresponding to the applications AP-1 to AP-3 and devices DB-1 to DB-5, which are access sources, and an access management mechanism is implemented for each interface.

The data processing system PS-1 performs processing related to data management, the data processing system PS-2 performs processing related to data distribution, the data processing system PS-3 performs processing related to data analyses, and the data processing system PS-4 performs processing related to device control. The device DB-1 represents a car, the device DB-2 and the device DB-3 represent smartphones, the device DB-4 represents an oscilloscope, and the device DB-5 represents an actuator.

As a technique of preparing an access management mechanism for each combination of a protocol and a processing system, for example, Non-Patent Literature 1 discloses a commercial access control technique related to REST API, and Non-Patent Literature 2 discloses a commercial access control technique related to an MQTT broker.

CITATION LIST

Non Patent Literature

Non Patent Literature 1: "What is Kong", [online], Kong-Open-source API Management and Microservice Management, (searched May 1, 2017), Internet <URL:https://getkong.org/about/>

Non Patent Literature 2: "mosquitto.conf-the configuration file for mosquitto", (searched May 1, 2017), Internet, <URL:http://mosquitto.org/man/mosquitto-conf-5.html>

SUMMARY

However, the conventional access management mechanism has a problem wherein setting management is required for each access management mechanism, resulting in an increase in operation costs. In addition, it is necessary to deal with each access management mechanism on the application side, and the burden of application development is heavy. Furthermore, there is an increased risk of inconsistencies in management policies (access control rules, etc.) between access management mechanisms.

Furthermore, as described above, since the access management mechanism handles sensitive data, it is necessary to control whether or not access to each processing system is permitted from an application or device based on the security policy of the user who introduces the IoT platform (for example, a factory manager in the manufacturing industry).

The present invention has been made in view of the above circumstances, and is intended to provide an access management apparatus and an access management method capable of constructing an access management mechanism as a gateway that is independent of a processing system or a protocol, and realizing integrated access management based on a set access management policy.

According to a first aspect of the present invention, an access management apparatus comprises a gateway including an access management function unit that is connected between an access source and a plurality of processing systems which process an access request from the access source, and that is configured to receive an access request from the access source, and to control the access request based on an access management policy set independently of protocols of the processing systems.

According to a second aspect of the present invention, the gateway further includes an access source identification function unit configured to acquire identification information of the access source based on an IP address of the access source and to transmit the acquired identification information of the access source to the access management function unit.

According to a third aspect of the present invention, the access management policy is stored in a cache memory of the gateway.

According to a fourth aspect of the present invention, the gateway further includes a protocol relay function unit configured to perform protocol conversion between the access source and the plurality of processing systems when the access request is approved by the access management function unit.

In the first aspect of the present invention, by managing the access management in an integrated manner through the gateway for the plurality of processing systems, it is possible to reduce the operation costs and to prevent the risk of inconsistency in access management policies.

In the second aspect of the present invention, the access source identification information that does not depend on an upper layer protocol can be realized by acquiring an access source ID using a low layer protocol information (IP address).

In the third aspect of the present invention, since the access management policy is cached on-memory, high-speed access management processing can be realized.

In the fourth aspect of the present invention, the protocol relay function unit is provided separately from the access management function unit, so that only access management can be managed in an integrated manner.

According to each aspect of the present invention, there is provided an access management apparatus and an access management method capable of constructing an access management mechanism as a gateway that is independent of a processing system or a protocol, and realizing integrated access management based on a set access management policy.

BRIEF DESCRIPTION OF THE DRAWINGS

FIG. 4 is a timing chart for explaining a second operation of access management of the IoT platform S according to the embodiment.

FIG. 5 is a diagram showing the relationship between data processing systems PS-1 to PS-4 and applications AP-1 to AP-3, which are access sources, and between the data processing systems PS-1 to PS-4 and devices DB-1 to DB-5, which are access sources.

FIG. 8 is a diagram for explaining effects of conventional individual access management and integrated access management of the present invention.

DETAILED DESCRIPTION

Embodiments of the present invention will be described below with reference to the drawings. In the embodiment, when it is not necessary to distinguish between the components, hyphens are omitted. For example, when there is no need to distinguish between the access sources AS-1, AS-2, . . . AS-n, hyphens are omitted, and the description is given as "AS." Other components will be described in the same manner.

Figure 1:
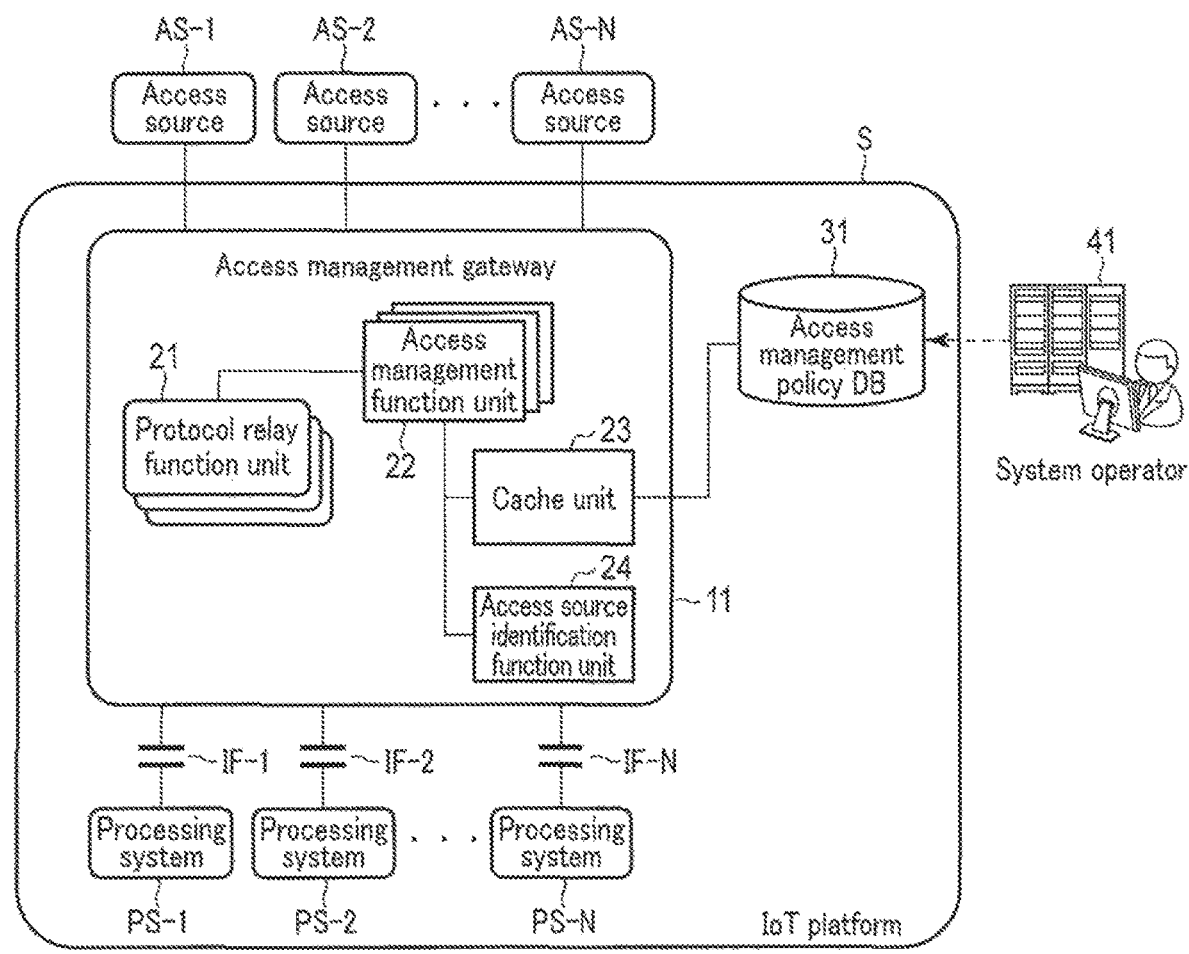
FIG. 1 is a diagram for explaining a configuration of an IoT platform S according to an embodiment of the present invention.

FIG. 1 is a diagram for explaining a configuration of an IoT platform S according to an embodiment of the present invention. As shown in FIG. 1, the IoT platform S includes a plurality of processing systems PS-1 to PS-N, protocol interfaces IF-1 to IF-N respectively corresponding to the processing systems PS-1 to PS-N, an access management gateway 11, and an access management policy database 31.

The access management gateway 11 is arranged between the plurality of access sources AS-1 to AS-N, such as applications and devices, and the plurality of processing systems PS-1 to PS-N, and includes a protocol relay function unit 21, an access management function unit 22, a cache unit 23, and an access source identification function unit 24.

The protocol relay function unit 21 is present for each combination of processing systems PS-1 to PS-N and protocols. The protocol relay function unit 21 relays access from applications or devices to the processing systems PS-1 to PS-N.

The access management function unit 22 is present for each access management function. The access management function unit 22 is a function that provides the protocol relay function unit 21 with access management processing to be inserted at the time of relay. For example, in the case of access control, the protocol relay function unit 21 relays after querying with the access management function unit 22 whether access can be relayed.

The cache unit 23 is a function for caching the information of the access management policy database 31 on the memory.

The access source identification function unit 24 is a function for acquiring identifiers (application ID, device ID) of the access sources AS-1 to AS-N using low layer protocol information (IP address, MAC address, etc.)

The access management policy database 31 is a database that stores an access management policy such as access control rules. The access management policy is set from a computer 41 of a system operator.

Figure 2:
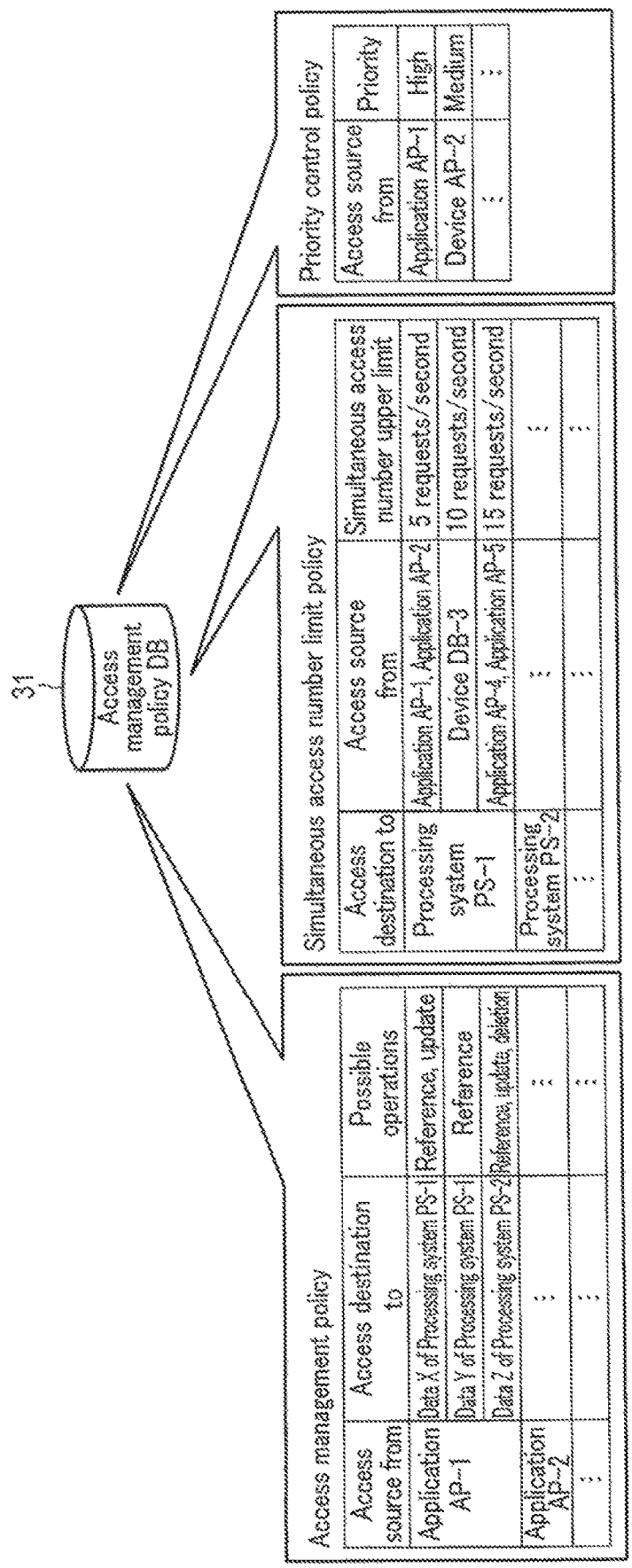
FIG. 2 is a diagram illustrating an example of an access management policy stored in an access management policy database 31.

FIG. 2 is a diagram illustrating an example of the access management policy stored in the access management policy database 31.

As shown in FIG. 2, an access source, an access destination, and possible operation types are stored in association with one another as an "access control policy." For example, when the access source is the application AP-1 and the access destination is data X of the processing system PS-1, only reference and update operations are permitted. When the access source is the application AP-1 and the access destination is data Y of the processing system PS-1, only a reference operation is permitted. When the access source is the application AP-1 and the access destination is data Z of the processing system PS-2, reference, update and deletion operations are permitted.

The access destination, the access source, and the simultaneous access number upper limit are stored in association with one another as a "simultaneous access number limit policy". For example, when the access destination is the processing system PS-1 and the access sources are the application AP-1 and the application AP-2, the simultaneous access upper limit is five requests/second. When the access destination is the processing system PS-1 and the access source is the device DB-3, the simultaneous access upper limit is ten requests/second. When the access destination is the processing system PS-1 and the access sources are the application AP-4 and the application AP-5, the simultaneous access upper limit is 15 requests/second.

The access source and a priority are stored in association with each other as a "priority control policy." For example, when the access source is the application AP-1, the priority is "high," and when the access source is the application AP-2, the priority is "medium."

Figure 3:
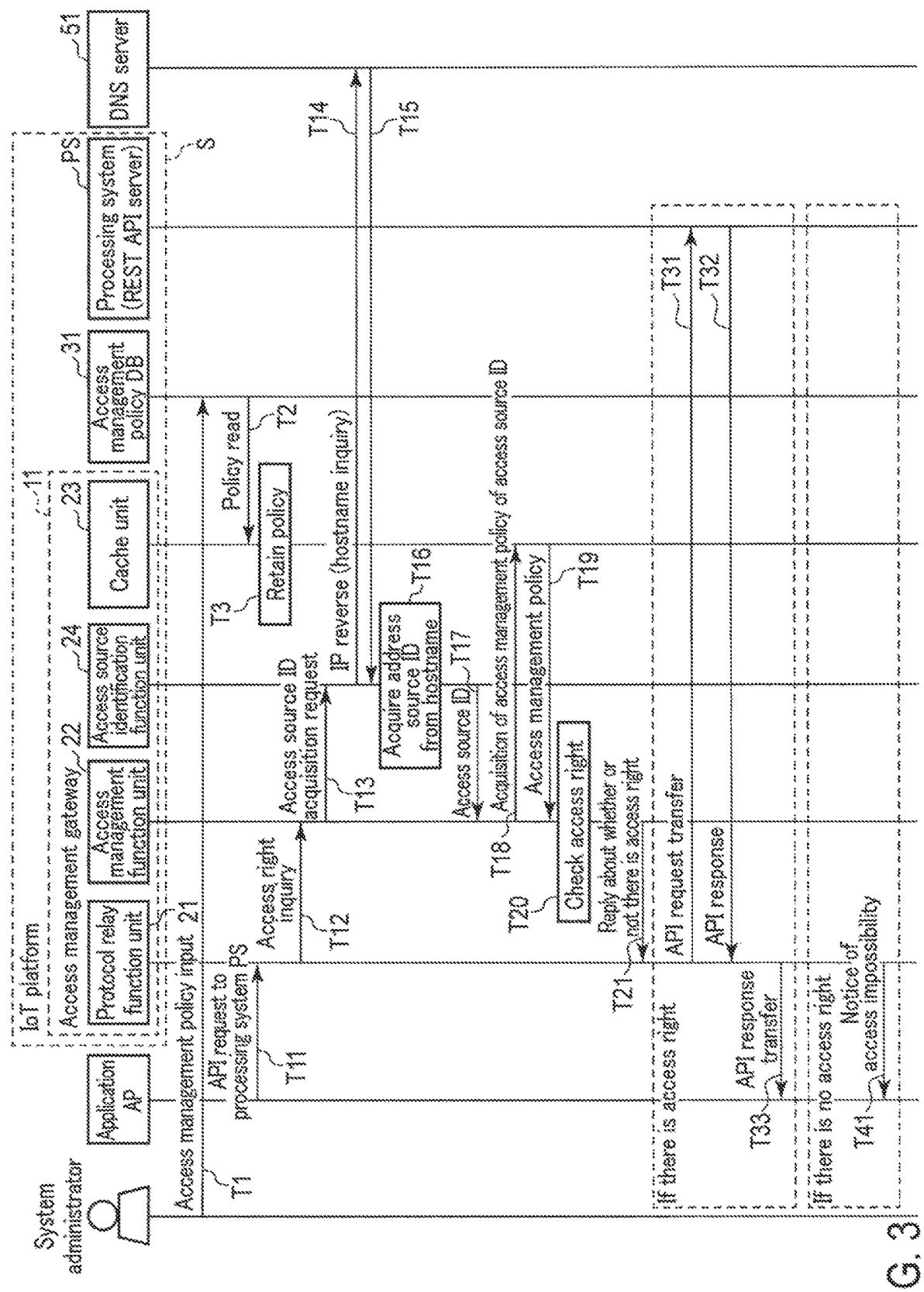
FIG. 3 is a timing chart for explaining a first operation of access management of the IoT platform S according to the embodiment.

Next, a first operation of access management of the IoT platform S according to the embodiment will be described with reference to the timing chart of FIG. 3. Note that the following environment is assumed when explaining the operation of access management.

The application AP, the device DB, and the access management gateway 11 are each a Docker container, and are arranged on the same Docker definition network.

An ID that uniquely represents each application or device is set as a container name of each application or device.

At this time, when receiving access from the application AP or device DB, the access management gateway 11 can obtain the container name (=access source ID) by reverse DNS of the IP address of the access source.

Based on this assumption, an access control sequence when an application AP accesses a REST API server will be described. Although FIG. 3 shows a case where an API request is made from the application AP, the same sequence is performed even in the case of the device DB.

First, the access management policy shown in FIG. 2 is input from the computer 41 of the system administrator to the access management policy database 31 (T1). The access management policy includes the access control policy, the simultaneous access number limit policy, the priority control policy, and the like shown in FIG. 2. The access management policy is stored in the access management policy database 31.

The access management policy stored in the access management policy database 31 is read into the cache unit 23 (T2), and the read access management policy is stored in the memory of the cache unit 23 (T3).

Next, an API request from the application AP to the processing system PS is transmitted to the protocol relay function unit 21 (T11). This API request is, for example, data transmission by the HTTP POST method.

Upon receipt of the API request, the protocol relay function unit 21 queries with the access management function unit 22 about the access right inquiry of the application AP (T12). At the time of the access right inquiry, the IP address of the access source and the URL of the access destination are transmitted.

Upon receipt of the access right inquiry from the protocol relay function unit 21, the access management function unit 22 outputs an access source ID acquisition request to the access source identification function unit 24 (T13).

The access source identification function unit 24 makes an inquiry about a hostname to a DNS server 51 using the IP address of the access source (T14), acquires the hostname from the DNS server 51 (T15), and acquires an access source ID from the hostname. (T16).

The identification of the access source by the DNS server 51 can be performed only in an environment where the IP address and the access source ID have a one-to-one relationship. In the embodiment, since it is assumed that the application AP and the access management gateway 11 are containers which belong to the same Docker definition network, the identification of the access source as mentioned above is possible.

Next, the access source identification function unit 24 transmits the acquired access source ID to the access management function unit 22 (T17). Based on the access source ID acquired from the access source identification function unit 24, the access management function unit 22 transmits an access management policy acquisition request for the access source ID to the cache unit 23 (T18).

The cache unit 23 transmits the access management policy of the access source ID among the access management policies read from the access management policy database 31 to the access management function unit 22 (T19).

The access management function unit 22 checks the access right based on the received access management policy of the access source ID (T20). Then, the presence/absence of an access right is transmitted to the protocol relay function unit 21 (T21).

If there is an access right, the protocol relay function unit 21 transfers the API request to the processing system PS of the transmission destination (T31), and receives an API response to the API request (T32). Then, the protocol relay function unit 21 transfers the received API response to the application AP of the access source (T33). If there is no access right, the protocol relay function unit 21 transfers the information that access is not permitted to the application AP of the access source (T41).

Next, a second operation of access management of the IoT platform S according to the embodiment will be described with reference to the timing chart of FIG. 4. Unlike the first operation, the second operation is an access management operation performed when the access source ID is not acquired using the low layer protocol information.

First, the access management policy shown in FIG. 2 is input from the computer 41 of the system administrator to the access management policy database 31 (T1). The access management policy includes the access control policy, the simultaneous access number limit policy, the priority control policy, and the like shown in FIG. 2. The access management policy is stored in the access management policy database 31.

The access management policy stored in the access management policy database 31 is read into the cache unit 23 (T2), and the read access management policy is stored in the memory of the cache unit 23 (T3).

Next, an API request from the application AP to the processing system PS is transmitted to the protocol relay function unit 21 (T51). This API request is, for example, data transmission by the HTTP POST method.

Upon receipt of the API request, the protocol relay function unit 21 queries with the access management function unit 22 about the access right inquiry of the application AP (T52). At the time of the access right inquiry, the IP address of the access source and the URL of the access destination are transmitted.

Upon receipt of the access right inquiry from the protocol relay function unit 21, the access management function unit 22 extracts the access source ID (S53). In this extraction, for example, the access management function unit 22 acquires the access source ID, which has been written in the HTTP header in advance. As described above, when the access source ID is not acquired using the low layer protocol information, it is necessary to design where the access source ID is to be written in the communication content of each protocol.

Based on the extracted access source ID, the access management function unit 22 transmits an access management policy acquisition request for the access source ID to the cache unit 23 (T54).

The cache unit 23 transmits the access management policy of the access source ID among the access management policies read from the access management policy database 31 to the access management function unit 22 (T55).

The access management function unit 22 checks the access right based on the received access management policy of the access source ID (T56). Then, the presence/absence of an access right is transmitted to the protocol relay function unit 21 (T57).

If there is an access right, the protocol relay function unit 21 transfers the API request to the processing system PS of the transmission destination (T31), and receives an API response to the API request (T32). Then, the protocol relay function unit 21 transfers the received API response to the application AP of the access source (T33). If there is no access right, the protocol relay function unit 21 transfers the information that access is not permitted to the application AP of the access source (T41).

Figure 6:
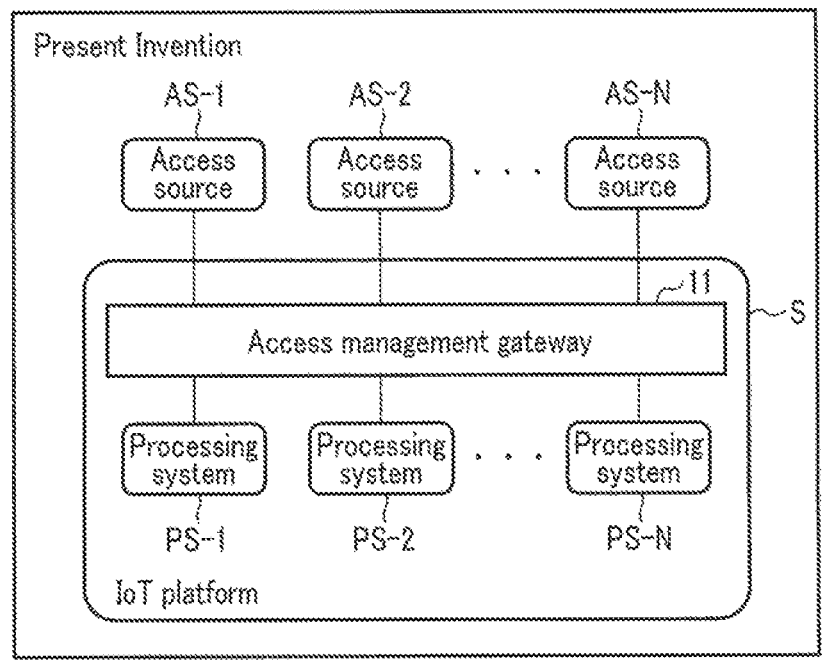
FIG. 6 is a diagram showing an outline of an access management apparatus of the IoT platform S of the embodiment.
Figure 7:
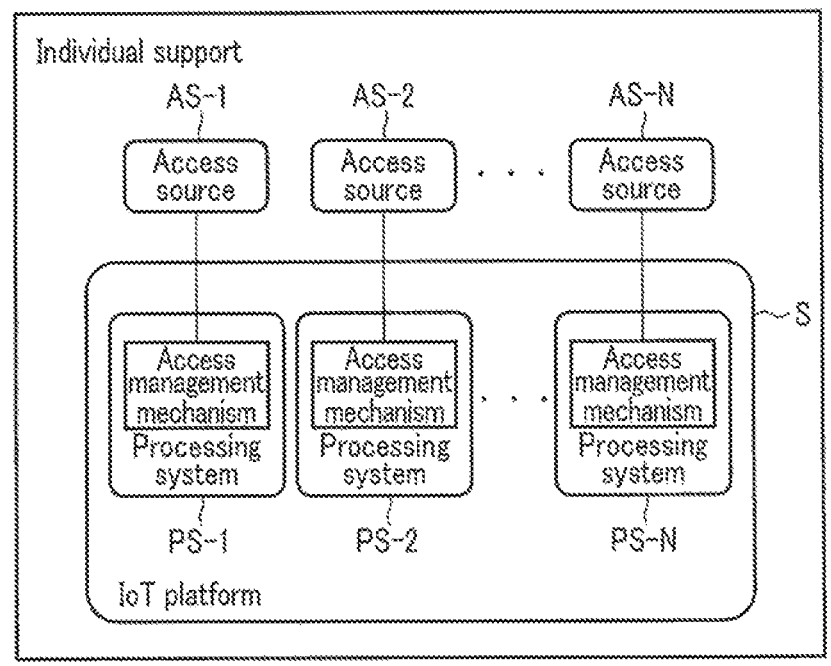
FIG. 7 is a diagram showing an outline of an access management apparatus of a conventional IoT platform S.

Thus, according to the access management apparatus of the IoT platform S of the embodiment, as shown in FIG. 6, the gateway 11 that relays access to various functions in an integrated manner is arranged to perform access management. Therefore, as shown in FIG. 7, compared with the case where access management is performed individually for each conventional function, access management can be realized with a smaller resource consumption and low operation costs.

FIG. 8 is a diagram for explaining effects of conventional individual access management and integrated access management of the present invention.

As shown in FIG. 8, according to the embodiment, the operation costs of access management can be reduced as compared with individual access management. This is because there is no need to input a policy to an individual access management mechanism, and addition, update, deletion, etc. can be performed in an integrated manner. Therefore, there is no risk of policy inconsistency in the access management of the embodiment.

Further, consumption of resources such as a memory can be reduced. This is because resources for use in access management are shared by a plurality of processing systems PS and protocols.

Furthermore, the development burden of the application AP and device DB can be reduced. This is because access management is performed in an integrated manner, thereby reducing learning costs for developers of application APs and device DBs.

Furthermore, it becomes easy to add a processing system PS or protocol. This is because it is not necessary to prepare an individual access management mechanism, and the access management function unit 22 is shared, so that only the protocol relay function unit 21 needs to be prepared.

Furthermore, since the access source ID (identification information) is obtained independently of the higher-level protocol information, it is not necessary to design "where the access source ID is to be written in the communication content" for each protocol.

Further, since the access management policy is cached on-memory, high-speed access management processing can be realized.

Therefore, according to the embodiment, there is provided an access management apparatus and an access management method capable of constructing an access management mechanism as a gateway that is independent of a processing system or a protocol, and realizing integrated access management based on a set access management policy.

While several embodiments of the present invention have been described, these embodiments have been presented by way of example and are not intended to limit the scope of the invention. Indeed, the embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An access management apparatus comprising a gateway including an access management function unit that is connected between an access source and a plurality of processing systems which process an access request from the access source, and that is configured to receive the access request from the access source without passing through the processing systems, and to control the access request based on an access management policy set independently of protocols of the processing systems,
    wherein the gateway is independent of the processing systems and relays an access from the access source to the processing systems,
    wherein in the access management policy, the access source, an access destination of the access source, and detail of an access limit with respect to the access request are associated; and
    wherein the detail of the access limit includes a possible operation type for the access source with respect to data input to and output from processing systems that is the access destination.

2. The access management apparatus according to claim 1, wherein the gateway further includes an access source identification function unit configured to acquire identification information of the access source based on an IP address of the access source and to transmit the acquired identification information of the access source to the access management function unit.

3. The access management apparatus according to claim 1, wherein the access management policy is stored in a cache memory of the gateway.

4. The access management apparatus according to claim 1, wherein the gateway further includes a protocol relay function unit configured to perform protocol conversion between the access source and the plurality of processing systems when the access request is approved by the access management function unit.

5. The access management apparatus according to claim 1, wherein the detail of the access limit is the number of simultaneous accesses from the access source to the access destination.

6. The access management apparatus according to claim 1, wherein the detail of the access limit is a priority of the access source.

7. An access management method in an access management apparatus comprising a gateway including an access management function unit that is connected between an access source and a plurality of processing systems which process an access request from the access source, and that is configured to receive the access request from the access source without passing through the processing systems, and to control the access request based on an access management policy set independently of protocols of the processing systems, wherein in the access management policy, the access source, an access destination of the access source, and detail of an access limit with respect to the access request are associated, wherein the gateway is independent of the processing systems and relays an access from the access source to the processing systems, the method comprising:

receiving an access request from the access source by the access management function unit; and controlling the access request based on the access management policy stored in a storage by the access management function unit, wherein the access management policy associates the access source with the access destination and one or more possible operation type for the access source with respect to data input to and output from processing systems that is the access destination.

8. The access management method according to claim 7, further performing a process of acquiring identification information of the access source based on an IP address of the access source and transmitting the acquired identification information of the access source to the access management function unit.

9. The access management method according to claim 7, further performing a process of storing the access management policy in a cache memory of the gateway.

10. The access management method according to claim 7, further performing a protocol conversion between the access source and the plurality of processing systems, when the access request is approved by the access management function unit.

11. The access management method according to claim 7, wherein the detail of the access limit is the number of simultaneous accesses from the access source to the access destination.

12. The access management method according to claim 7, wherein the detail of the access limit is a priority of the access source.

13. A non-transitory computer readable storage medium storing a program for executing an access management method in an access management apparatus comprising a gateway including an access management function unit that is connected between an access source and a plurality of processing systems which process an access request from the access source, wherein the gateway is independent of the processing systems and relays an access from the access source to the processing systems, wherein the program causes the access management function unit to:

receive the access request from the access source without passing through the processing systems; and control the access request based on an access management policy set independently of protocols of the processing systems, wherein the access management policy associates the access source with the access destination and one or more possible operation type for the access source with respect to data input to and output from processing systems that is the access destination.

* * * * *